United States Patent [19]

Daly et al.

[11] Patent Number: 4,563,122

[45] Date of Patent: Jan. 7, 1986

[54] INDUSTRIAL ROBOT

[75] Inventors: Peter Daly, Lyme Regis, England; Maurice Jeanmairet, Boudry, Switzerland

[73] Assignee: Microbo S.A., Neuchatel, Switzerland

[21] Appl. No.: 604,341

[22] Filed: Apr. 26, 1984

[30] Foreign Application Priority Data

May 6, 1983 [CH] Switzerland ................. 2505/83

[51] Int. Cl.⁴ ............................................ B25J 17/62
[52] U.S. Cl. ................................. 414/732; 414/736; 901/29
[58] Field of Search ................... 901/49, 50; 414/730, 414/735, 728, 644, 732

[56] References Cited

U.S. PATENT DOCUMENTS 3,866,485  2/1975  Blatt ................... 901/50 X
4,406,576  9/1983  Inaba et al. ............ 901/49 X Primary Examiner—Terrance L. Siemens
Attorney, Agent, or Firm—Pollock, Vande Sande & Priddy

[57] ABSTRACT

An industrial robot is described having a movable arm, a wrist pivotally mounted for motion about an axis at the free end of the arm, and a cylindrical shaft perpendicular to said axis and rotatably mounted on the wrist. To enable it to be used for holding components subjected to forces, as during grinding operations, the robot is provided with a pair of jaws that can be clamped on the shaft and are able to prevent both the shaft from rotating and the wrist from pivoting. Movement of the jaws is controlled by shoes which are slidably mounted on a pair of circularly curved parallel rails having a common center coinciding with the pivotal axis of the wrist.

3 Claims, 3 Drawing Figures

1

INDUSTRIAL ROBOT

BACKGROUND OF THE INVENTION

This invention relates to industrial robots, and more particularly to a robot of the kind comprising a movable arm, a wrist pivotally mounted on the arm and an end shaft carried by the wrist.

When such a robot is used for holding a component having to be subjected to operations such as polishing or grinding operations, it is essential for the robot to keep the component as still as possible. This is generally achieved by resorting to electric motors having a large positioning torque. Such an arrangement suffers however from the dual drawback of not ensuring absolute immobility and more importantly of requiring a heavier motor, thereby substantially slowing down the movements of the robot. This dual drawback is particularly bothersome with small robots whose speed, at least as regards the wrist and the end shaft, is precisely one of its major attributes.

SUMMARY OF THE INVENTION

An object of the invention is to provide a robot whose wrist and end shaft may be satisfactorily immobilized without substantially affecting the speed of their movements.

To this end, the robot according to the invention is fitted with mechanical locking means borne by the arm and able to act on the end shaft both to prevent it from rotating and the wrist from pivoting.

Preferably, the mechanical locking means comprise:

a pair of jaws on opposite sides of the end shaft arranged symmetrically in relation to the diametral plane of the shaft that is perpendicular to the pivotal axis of the wrist such that the shaft may be gripped by the jaws;

a pair of circularly curved parallel rails having a common centre substantially coinciding with the pivotal axis of the wrist and which are fixedly mounted on the arm symmetrically in relation to said diametral plane such that in any position of the wrist the shaft lies between the rails; and clamping means borne by the rails for applying the jaws against the shaft to prevent the shaft from rotating and the wrist from pivoting.

Figure 2:
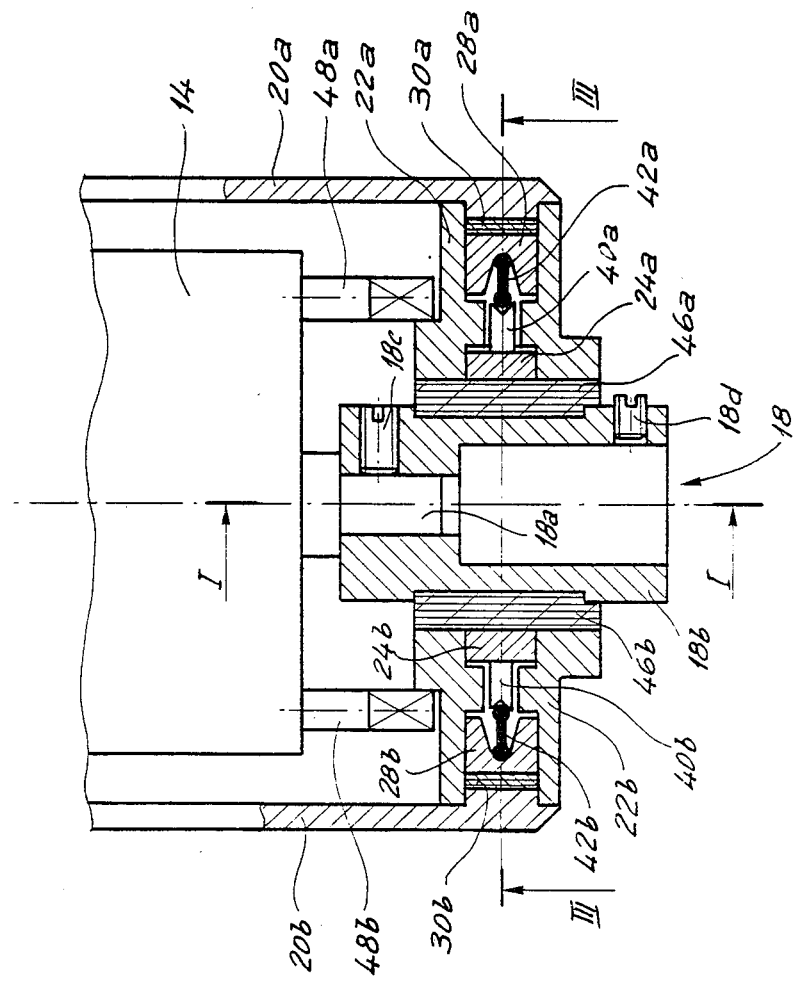
FIG. 2 is a partly sectional view along line II—II of FIG. 1.

The robot shown in the drawings comprises a movable arm 10 able to pivot about, and to move along, a vertical axis 12 under the control of means not shown. Arm 10 carries at its free end a wrist 14 mounted for pivotal motion about a horizontal axis 16 under the control of an electric motor (not shown) housed inside arm 10. A second electric motor (not shown), housed inside wrist 14, rotatably drives an end shaft 18 whose axis is perpendicular to pivotal axis 16 of wrist 14. End shaft 18 includes a stub 18a driven by the second electric motor and a socket 18b fixedly mounted on stub 18a by a grub screw 18c (FIG. 2). Socket 18b is designed to receive a tool (not shown) which is held in place by a grub screw 18d and which carries the component having to be subjected, for instance, to facet grinding or polishing operations.

The robot, so far quite conventional, is provided with a mechanical locking system acting on end shaft 18 both to prevent it from rotating and the wrist from pivoting. This system will now be described in greater detail.

Arm 10 carries a pair of circularly curved flanges 20a and 20b whose centres coincide with pivotal axis 16 of wrist 14 and which are symmetrically disposed on opposite sides of the diametral plane of end shaft 18 that is perpendicular to axis 16. The mean radius of flanges 20a and 20b is such that, in each position of wrist 14, shaft 18 lies between them.

Figure 1:
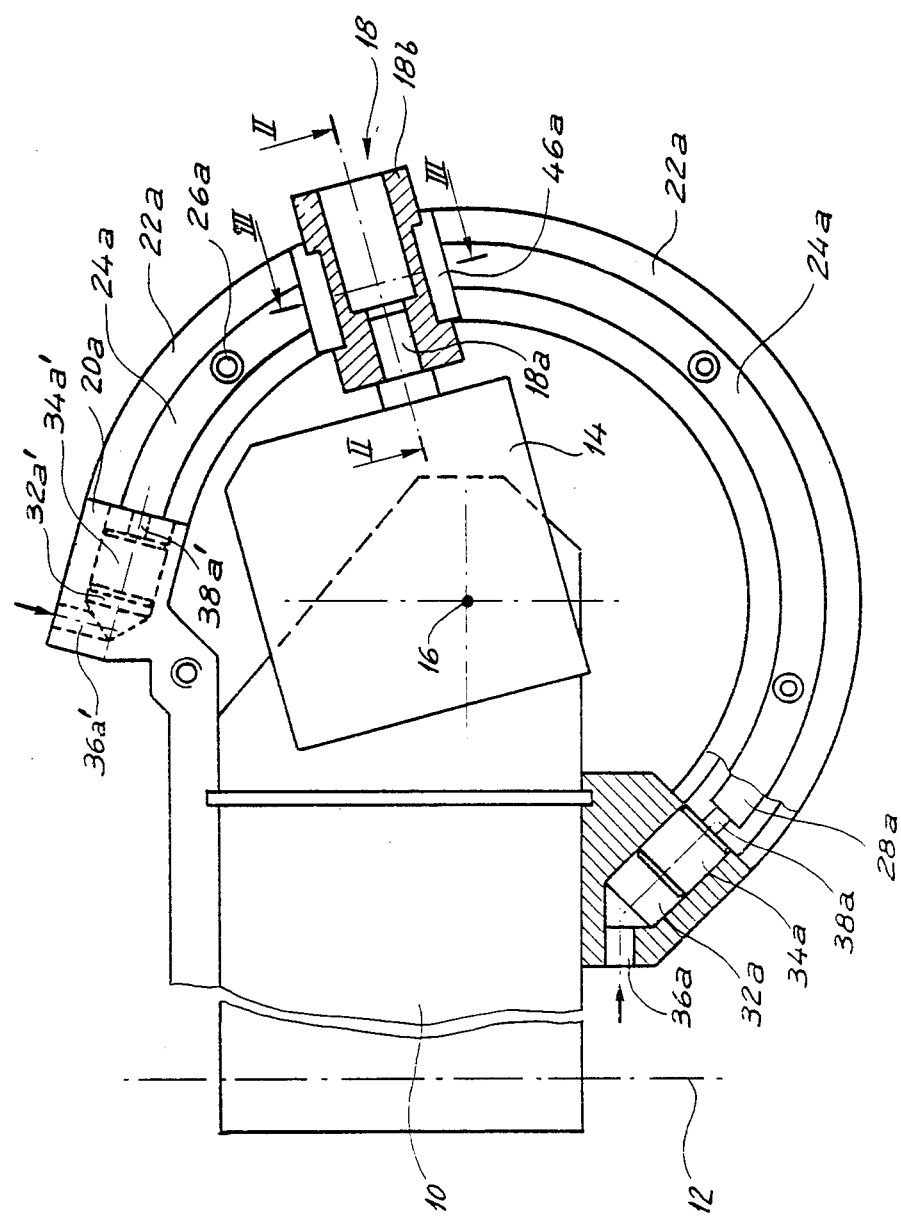
FIG. 1 is a general, partly sectional, view of a robot according to the invention.
Figure 3:
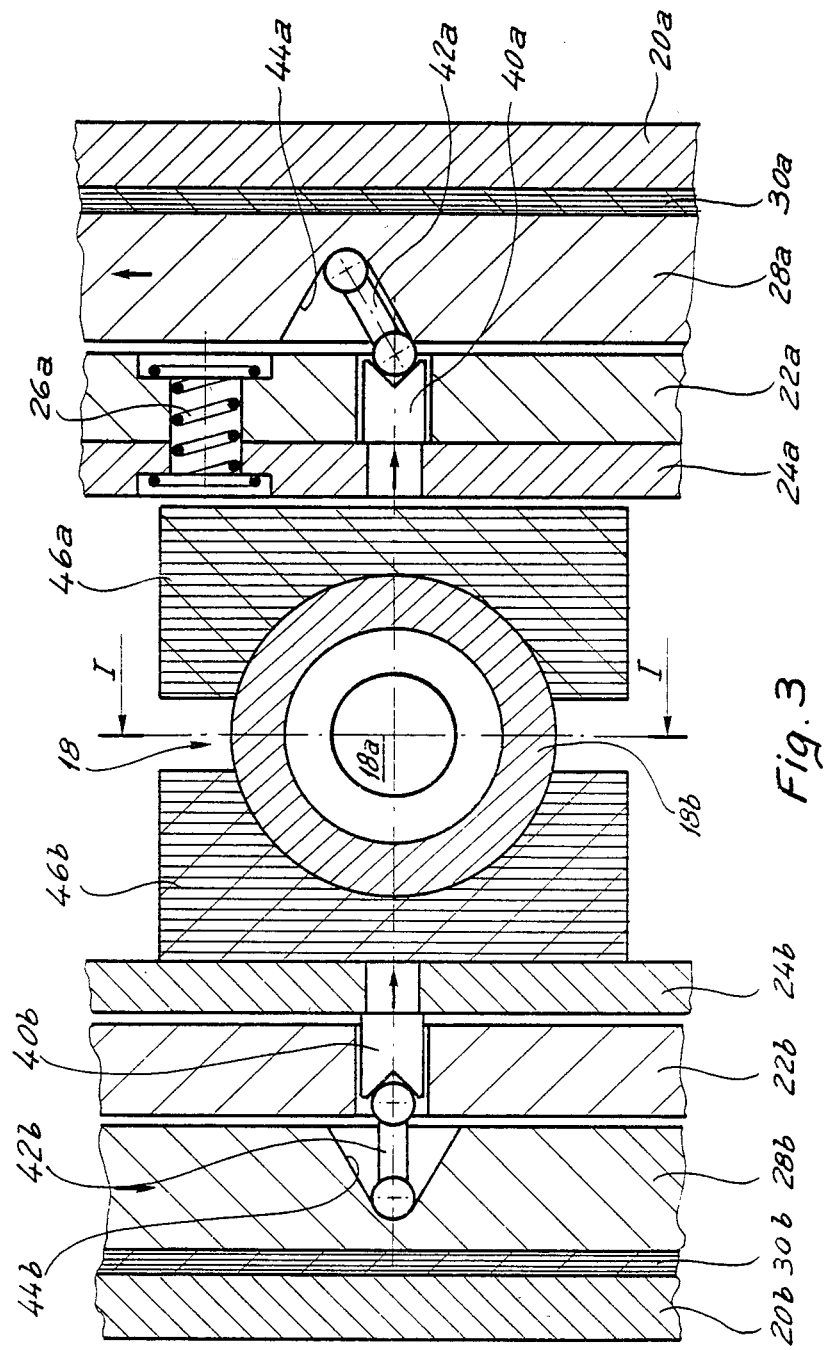
FIG. 3 is a partly sectional view along line III—III of FIG. 1.

Flanges 20a and 20b bear, on their facing surfaces, a pair of circularly curved rails 22a and 22b secured to the flanges by screws not shown. Rail 22a is provided with an inner groove (FIG. 2) inside which is fitted a circularly curved shoe 24a urged against the bottom of the groove by springs 26a (FIGS. 1 and 3). Rail 22a is also provided with an outer groove (FIG. 2) in which is fitted a second circularly curved shoe, 28a, which, unlike shoe 24a, is slightly shorter than the groove and can therefore slide along it. A circularly curved nylon element 30a, sandwiched between shoe 28a and a correspondingly shaped bearing surface of flange 20a, facilitates the sliding motion of shoe 28a in the outer groove.

At opposite ends of flange 20a are provided cylindrical chambers 32a and 32a' inside which pistons 34a and 34a' may be actuated by compressed air fed into one or other chamber via channels 36a and 36a' to slide shoe 28a one way or the other along the outer groove by means of piston rods 38a and 38a'. When lower piston 34a is in its operative position (FIG. 1), shoe 28a is in a "high" position. When, on the other hand, upper piston 34a' is activated, shoe 28a is in a "low" position.

The inner, non sliding, shoe 24a is fitted over its entire length with a plurality of studs 40a (only one of which is visible in FIGS. 2 and 3) extending freely through openings bored in rail 22a. The free ends of studs 40a are formed with conical recesses for receiving one end of transmission members 42a each consisting of a rodlet having spherically dished ends and of two ball bearings seated in the dished ends of the rodlet. One of the ball bearings is also seated in the recessed end of its associated stud 40a, while the other ball bearing is also seated at the bottom of a conical recess 44a formed in the outer, sliding, shoe 28a. The depth of the conical recesses 44a is such that the rodlets of members 42a are practically wholly accommodated therein.

Corresponding parts are provided on the other side of end shaft 18 where they have the same reference numbers suffixed with the letter b. On the right-hand side of FIG. 3, transmission member 42a is in an inclined position while on the left-hand side of FIG. 3 transmission member 42b is in a horizontal position. The inclined position of member 42a corresponds to the "high" position of sliding shoe 28a and the horizontal position of member 42b corresponds to the "low" position of sliding shoe 28b. These differing positions of members 42a and 42b are for explanatory purposes only as both members 42a and 42b will in practice either both be inclined or both be horizontal since the lower pair of pistons 34a and 34b or the upper pair of pistons 34a' and 34b' will always be actuated in unison.

A pair of identical jaws 46a and 46b are disposed on opposite sides of end shaft 18, symmetrically in relation to the above mentioned diametral plane of shaft 18. The jaws are preferably made of a plastics impregnated woven material known as "Canevasite". But other materials may also be used. Each jaw comprises, to one side, a concave cylindrical surface having a radius substantially equal to the outer radius of shaft 18 and, on the other side, a flat surface adjacent inner shoe 24a or 24b. Neither jaw is secured to any other part of the mechanism; they are held in place merely by the action exerted thereon by shaft 18 and the adjacent shoes.

Wrist 14 carries a pair of posts 48a and 48b acting as bearings for rails 22a and 22b to prevent them moving apart. Their function will become clearer below.

If sliding shoes 28a and 28b are both moved to their "high" position (the right-hand side of FIG. 3) by injecting compressed air into lower chambers 32a and 32b of the mechanism the transmission members 42a and 42b come to occupy, as already stated, an inclined position. The perpendicular distance between the bottoms of conical recesses 44a and 44b and the recessed tips of studs 40a and 40b is then least so that, under the action of return springs 26a and 26b, the two inner shoes 24a and 24b move away from jaws 46a and 46b to come into contact with rails 22a and 22b. The space between shoes 24a and 24b and shaft 18 is then somewhat larger than before, thereby unclamping jaws 46a and 46b, leaving shaft 18 free to rotate and allowing wrist 14 to be pivoted about axis 16.

If, on the other hand, the locking mechanism is to be activated, sliding shoes 28a and 28b are moved to their "low" position (the left-hand side of FIG. 3) by injecting compressed air into upper chambers 32a' and 32b' of the mechanism. As indicated earlier, transmission members 42a and 42b then come to occupy a horizontal position so that the perpendicular distance between the bottoms of conical recesses 44a and 44b and the recessed tips of studs 40a and 40b becomes greatest, with inner shoes 24a and 24b being pushed towards shaft 18 and jaws 46a and 46b being pressed against the latter. Jaws 46a and 46b are then wedged between shaft 18 and shoes 24a and 24b thereby preventing both rotation of shaft 18 and shoes 24a and 24b and pivotal motion of wrist 14 about axis 16. Posts 48a and 48b help to prevent rails 22a and 22b moving apart under the action of transmission members 42a and 42b, thereby reinforcing the action of flanges 20a and 20b.

In short, the robot is locked by feeding compressed air into upper chambers 32a' and 32b' of the mechanism, thereby moving shoes 24a and 24b to their "low" position. To unlock the robot, compressed air is fed into lower chambers 32a and 32b to move shoes 24a and 24b to their "high" position. Such mechanical locking is of course far more effective than any other kind of locking. Besides, wrist 14 and end shaft 18 do not have to bear the weight of the mechanism and so fully retain their ability to move swiftly. The object of the invention is thus fully achieved.

We claim:

1. An industrial robot comprising:
   a movable arm;
   a wrist pivotally mounted about an axis at one end of the arm;
   a cylindrical shaft perpendicular to the pivotal axis of the wrist and rotatably mounted on the wrist; and,
   mechanical locking means able to act on the shaft both to prevent the shaft from rotating and the wrist from pivoting; said mechanical locking means including:
   a pair of jaws disposed on opposite sides of the shaft symmetrically in relation to the diametral plane of the shaft that is perpendicular to the pivotal axis of the wrist, such that the shaft may be gripped by the jaws;
   a pair of circularly curved parallel rails having a common center substantially coinciding with the pivotal axis of the wrist and being fixedly mounted on the arm symmetrically in relation to the diametral plane such that in any position of the wrist the shaft lies between the rails; and,
   clamping means borne by the rails for applying the jaws against the shaft to prevent the shaft from rotating and the wrist from pivoting.

2. A robot as in claim 1, wherein the clamping means include for each rail:
   first and second shoes disposed parallel to one another with the first shoe, facing one jaw, able to occupy a first position in which it is applied against said one jaw and a second position in which it is not applied against said one jaw;
   a plurality of transmission members between said shoes and able to occupy, depending on the relative position of the shoes, a first position in which said first shoe is moved into its first position, and a second position in which said first shoe is moved into its second position; and
   means for modifying the relative position of said two shoes.

3. A robot as in claim 2, wherein the means for modifying the relative position of said two shoes include at least one pneumatically actuatable piston for communicating its motion to one of the shoes.

* * * * *